Patented Mar. 2, 1954

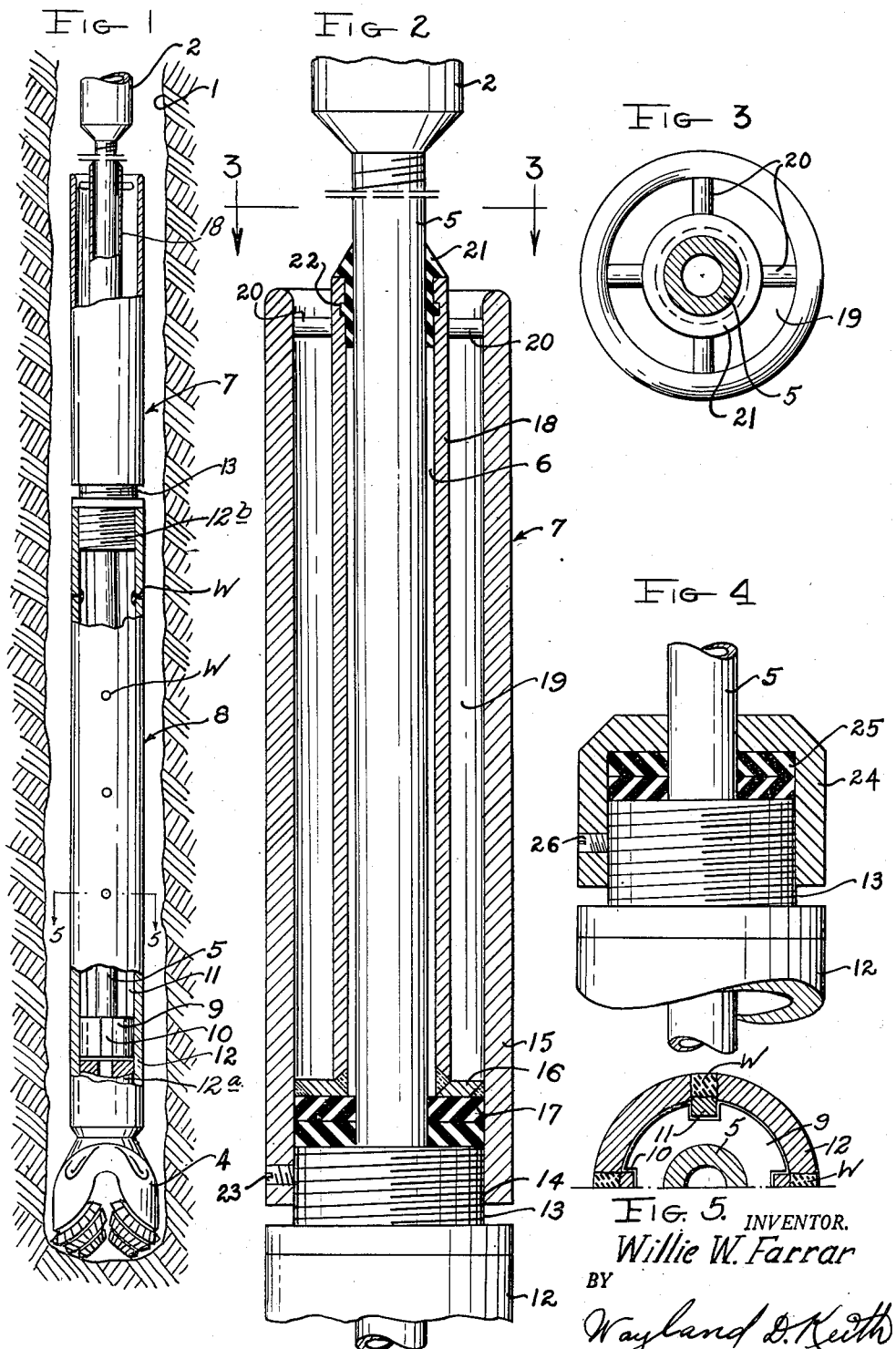

2,670,930

UNITED STATES PATENT OFFICE 2,670,930

COMBINATION FISHING TOOL AND
CIRCULATING JARS

Willie W. Farrar, Wichita Falls, Tex.

Application April 12, 1950, Serial No. 155,505

4 Claims. (Cl. 255—27)

This invention relates to improvements in a combination fishing tool and circulating jars for use with rotary well drilling equipment, and more particularly to the combination of a fishing tool and circulating jars positioned near the bottom of the well in order that heavy solids can be recovered from the drilling mud that cannot normally be circulated to the top of the well.

Various fishing tools and circulating jars have been proposed heretofore, but these have been separate and independent tools and could not successfully be connected together to get the receiving portion of the fishing tool in close proximity to the bottom of the well to receive the heavy solids from the drilling fluid.

An object of the present invention is to provide in combination circulating jars and a fishing tool having a receptacle formed therein whereby the formation and/or foreign matter being drilled up can be acted upon both by rotary and impact action and while this action is being performed drilling fluid is circulated through the well to wash the heavy solids upward a short distance to deposit such heavy solids, such as rock, metallic cuttings and the like into the receptacle of the fishing tool.

Another object of the invention is to provide a junk basket in combination with circulating jars whereby the junk basket may be readily removed and the drilling jars stem packing equipment replaced to enable the circulating jars to be used without the fishing tool.

Still another object of the invention is to provide the combination of drilling jars and a fishing tool having a receptacle whereby the stem of the circulating jars may be reciprocated through the receptacle without permitting the stem to become wedged within the inner bore of the fishing tool.

In the drilling up of cast iron plugs and other metallic objects within the well, the heavy solids will not move with the drilling fluid unless the drilling fluid moves at such high velocity as to prevent iron or other heavy solids from settling back, which settling of the solids would frequently result in the drill bit or the circulating jars from becoming wedged within the bore hole. The annular space between the wall of the well and the tool presents a restricted cross sectional area which causes an increase velocity over the fluid flowing above the tool, which moves the solids into the receptacle 19. With the circulating jars used in combination with the fishing tool, an impact can be produced to break up the iron or other heavy solids in such manner that larger pieces may be directed into a fishing tool than has been possible heretofore. These larger pieces of solids from the lower portion of the bore hole of the well are entrained within the viscous fluid and are moved upward by the circulation of the drilling fluid to be trapped within the receptacle of the fishing tool, and since the receptacle is removable, it is possible for the debris to be readily removed therefrom.

An embodiment of this invention is illustrated in the accompanying drawings, in which:

Fig. 1 is a vertical sectional view through a well showing the combination fishing tool, circulating jars, drill bit and drill stem in elevation, with parts broken away and shown in section to bring out the details of construction;

Fig. 2 is an enlarged elevational view of the fishing tool with parts shown in section;

Fig. 3 is a sectional view taken on the line 3—3 of Fig. 2, looking in the direction indicated by the arrows;

Fig. 4 is a fragmentary elevational view of the gland which enables the use of the drilling jars without the fishing tool, and with parts shown in section; and Fig. 5 is a partial section taken substantially at 5—5 Fig. 1, looking in the direction as indicated by the arrows.

With more detailed reference to the drawing the numeral 1 designates the bore hole of a well, with a drill stem 2 positioned therein, and the combination fishing tool and circulating jars generally designated as 8 positioned on the lower end thereof. The lower end of the circulating jars is adapted to receive a rotary drill bit 4.

For more detailed reference to the circulating jars reference may be had to my prior application Ser. No. 27,775, Circulating Jars, filed May 18, 1948, now abandoned.

A reduced stem 5 is connected to circulating jars and is coupled to the lower end of the drill stem 2. The stem 5 is adapted to extend through the inner bore 6 of the fishing tool 7 and through circulating jars 8 to receive a hammer 9 on the lower end thereof.

The hammer 9 has grooves 10 in the side thereof, which grooves are adapted to engage ribs 11 which are secured to the inner bore of the casing 12 by welds W, as shown in Figs. 1 and 5 of the circulating jars. The hammer 9 is slidably fitted within the casing 12 between anvils 12a and 12b of the circulating jars yet so that the grooves 10 interengage with the ribs 11 to prevent relative turning therebetween. The upper end of the circulating jars is threaded at 13 to the anvil 12b which threaded portion 13 is adapted to receive a screw threaded portion 14 on the lower end of the outer barrel 15 of the fishing tool. A transverse wall 16 is spaced upwardly from the lower end of the outer tubular member 15 so as to form a packing receiving chamber to receive packing element 17. The fishing tool 7 has an inner tubular member 18 spaced inward from outer tubular member 15 so as to form an annular receptacle 19. The upper ends of the respective walls are held in spaced relation by bars 20 secured to the tubular members 15 and 18. The inner bore 6 of the fishing tool is adapted to receive a rubber packing element 21 at the upper end which packing element is held in place by a rib 22 interfitting with a coacting groove in the inner bore 6 of the tubular member 18. This packing 17 closes the lower end of the bore 6, therefore the stem 5 is free to slide through the packing elements 17 and 21 without allowing the entry of foreign matter into the bore. The upper end of the packing element 21 is conical and forms a stripping edge with the slidable stem 5 which prevents the entrance of foreign matter and sand into the inner bore 6, which would cause the sticking of stem 5 and prevent movement thereof.

The stem 2 extends a spaced distance above the fishing tool, thereby drilling fluid as pumped down through the drill stem 2 and through the bit 4 is discharged up the annulus formed by the fishing tool and circulating jars 3 and the wall of the well. Due to this annulus being of restricted cross sectional area, the velocity of the drilling fluid is relatively high, which will cause the drilling fluid to carry heavy solids upward until an enlarged cross sectional area is reached above the top of the fishing tool. Thus the velocity of the drilling fluid will be reduced and due to the turbulence at the top of the fishing tool, the heavy solids will be directed inward and with the drilling fluid in a more quiescent state, the solids will drop into the annular receptacle 19. After the desired amount of drilling has been accomplished the drill stem 2 may be withdrawn from the well and the debris that has been collected in the receptacle 19 may be removed therefrom.

In order to remove the fishing tool 7, a set screw 23 is loosened and the fishing tool removed from the reduced stem 5. If desired, the fishing tool may be dispensed with, and a gland cap 24, having packing 25 therein substituted therefor, and with the gland 24 screwed in place, the set screw 26 may be locked in place.

It is to be pointed out that by dropping the drill stem suddenly, the hammer 9 will be caused to strike an anvil 12a in the lower end of the jars to give a sudden jarring action downward. However, the jars are capable of both upward and downward impact blows. If it is desired to loosen a wedged tool that has become stuck or wedged in a tight hole due to swelling of the formation which constricts the bore hole or by the caving of the formation from above, an impact blow of the jars upwardly may be performed by taking a strain upwardly on the drill stem, which is then suddenly partially released, which, due to its weight and the sudden downward movement given thereto, which will cause the drill stem to stretch, then by sudden application of the brake, the stretched drill stem will recoil to cause an upward impact of the hammer 9 against the anvil 12b of the jars, which will loosen the tool. The jarring action upward will cause stuck bit, jars and fishing tool to move upward through the debris, the debris will be deposited within the receptacle 19.

It will be readily appreciated that the combination of a tool of substantially the same diameter from the bit to the top of the fishing tool is necessary to cause the high velocity of the drilling fluid to the top of the fishing tool, whereupon the cross-sectional area greatly increases, which causes the heavy solids to drop into receptacle 19 rather than to be held in suspension in the drilling fluid.

While the invention has been described in one embodiment thereof, it is to be understood that changes may be made in the minor details of construction, and adaptations made to different operating conditions, without departing from the spirit of the invention as claimed.

Having thus clearly shown and described the invention what is claimed as new and desired to secure by Letters Patent is:

1. In a fishing tool for use with a set of jars on a hollow rotary drill stem, an annular receptacle formed of an inner and an outer cylinder having the annular portion closed near the lower end of said cylinders and open at the upper ends thereof, means for attachably securing the lower end of said receptacle to the upper end of said jars, said jars having a plunger which is adapted to pass through said inner cylinder for free reciprocation therein, and gland means at each end of said inner cylinder for excluding foreign matter from the interior thereof during the reciprocation of said plunger.

2. In a fishing tool for rotary drilling equipment the combination of a hollow drill stem and circulating jars, which jars have a plunger therein adapted to be reciprocated, said jars being actuated by said drill stem, a receptacle formed of inner and outer tubular elements and positioned around said plunger of said circulating jars, said inner tubular element having its lower end spaced upwardly from the lower end of said outer tubular element, a bottom secured to said tubular elements at the lower end of said inner tubular element, said outer tubular element having its lower inner diameter threaded to receive the upper threaded end of said jars, a packing member interposed between the upper end of said jars and said bottom formed in the lower end of said annular space so as to form a seal therewith and with said plunger passing therethrough, the upper end of said inner tubular element having a resilient sealing element positioned between said plunger and said inner tubular element so as to prevent entrance of foreign matter into said inner tubular element, and lateral elements secured to said tubular elements near the upper ends thereof so as to hold said tubular elements in spaced relation to permit the entrance of foreign matter into the open end of an annular space formed between said tubular elements.

3. In a fishing tool, a tubular casing, an anvil mounted in each end of said casing and each anvil having a bore formed therein, a tubular stem extending through one of said anvils into said tubular casing and having a hammer mounted thereon between said anvils, a receptacle having an open end, mounted on one of said anvils, an axial tubular liner mounted within said tubular casing and slidably receiving said tubular stem therein, and packing elements between each end of said tubular liner and said tubular stem.

4. In a tool for use with a hollow rotary drill stem, a set of jars having a tubular casing, means on said drill stem for connection with said jars, an anvil mounted in each end of said casing, a bore in one of said anvils, a tubular stem mounted in said bore within said casing for relative, longitudinal sliding movement, a hammer mounted on said tubular stem intermediate said anvils, a tubular receptacle mounted on the upper end of said casing and surrounding said tubular stem, an axial tubular liner mounted within said receptacle and surrounding said stem, a packer element intermediate said tubular liner and said upper anvil, and a further packing element having a sharp, conical upper edge surrounding said tubular stem and forming a fluid seal therewith.

WILLIE W. FARRAR.

References Cited in the file of this patent

UNITED STATES PATENTS

| Number | Name | Date |
|---|---|---|
| 478,605 | Ireland | July 12, 1892 |
| 1,519,551 | Primmer | Dec. 16, 1924 |
| 1,656,526 | Lincoln | Jan. 17, 1928 |
| 1,672,464 | North | June 5, 1928 |
| 1,895,610 | Del'Homme | Jan. 31, 1933 |
| 2,252,912 | Armentrout | Aug. 19, 1941 |